United States Patent
Hong et al.

(10) Patent No.: US 11,184,936 B2
(45) Date of Patent: Nov. 23, 2021

(54) METHOD AND APPARATUS FOR MANAGING A BEARER CONFIGURATION OF A RELAY USER EQUIPMENT

(71) Applicant: LG Electronics Inc., Seoul (KR)

(72) Inventors: Jongwoo Hong, Seoul (KR); Taehun Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/487,964

(22) PCT Filed: May 4, 2018

(86) PCT No.: PCT/KR2018/005216
§ 371 (c)(1),
(2) Date: Aug. 22, 2019

(87) PCT Pub. No.: WO2018/203723
PCT Pub. Date: Nov. 8, 2018

(65) Prior Publication Data
US 2020/0059980 A1     Feb. 20, 2020

Related U.S. Application Data

(60) Provisional application No. 62/502,588, filed on May 5, 2017.

(51) Int. Cl.
*H04W 76/14*     (2018.01)
*H04W 76/18*     (2018.01)
(Continued)

(52) U.S. Cl.
CPC .......... *H04W 76/14* (2018.02); *H04W 8/005* (2013.01); *H04W 48/16* (2013.01); *H04W 76/18* (2018.02);
(Continued)

(58) Field of Classification Search
CPC ..... H04W 76/14; H04W 76/18; H04W 76/27; H04W 8/005; H04W 48/16; H04W 80/02;
(Continued)

(56) References Cited

U.S. PATENT DOCUMENTS

2013/0143574 A1\*   6/2013   Teyeb ................. H04W 72/044
                                                           455/438
2013/0287012 A1\*   10/2013   Pragada ................. H04W 76/25
                                                           370/338
(Continued)

FOREIGN PATENT DOCUMENTS

WO       2016059063 A1     4/2016

OTHER PUBLICATIONS

R2-1703134:3GPP TSG-RAN WG2 meeting #97bis, Spokane, USA, Apr. 3-7, 2017, "Consideration of Bearer configuration in FeD2D," LG Electronics Inc., pp. 1-4.
R2-1703071: 3GPP TSG-RAN WG2 meeting #9 7bis, Spokane, USA, Apr. 3-7, 2017, "Discussion on QoS aspects for feD2D," ZTE, pp. 1-3.
(Continued)

*Primary Examiner* — Michael K Phillips
(74) *Attorney, Agent, or Firm* — Dentons US LLP

(57) ABSTRACT

The present invention is directed to a method and an apparatus for use in a wireless communication system. Specifically, the present invention is directed to a method comprising: receiving a bearer list of a relay User Equipment (UE) from a mobility management entity (MME) of the relay UE; receiving a bearer list of a remote UE from a MME of the remote UE; and if the bearer list of the relay UE has no bearer that matches to the bearer list of the remote UE in terms of delay budget of a specific service, transmitting a request for additional bearer setup including a cause value associated with the delay budget to the MME of the relay UE, and an apparatus therefore.

12 Claims, 15 Drawing Sheets

(51) Int. Cl.
*H04W 76/27* (2018.01)
*H04W 8/00* (2009.01)
*H04W 48/16* (2009.01)
*H04W 80/02* (2009.01)
*H04W 88/04* (2009.01)

(52) U.S. Cl.
CPC .......... *H04W 76/27* (2018.02); *H04W 80/02* (2013.01); *H04W 88/04* (2013.01)

(58) Field of Classification Search
CPC ....... H04W 88/04; H04W 8/08; H04W 76/10; H04W 76/23; H04W 88/16; H04W 36/0033; H04W 76/25; H04W 92/18; H04W 36/03
See application file for complete search history.

(56) References Cited

U.S. PATENT DOCUMENTS

| | | | |
|---|---|---|---|
| 2014/0087736 A1 | 3/2014 | Shoshan et al. | |
| 2015/0296424 A1* | 10/2015 | Xu | H04W 36/0033 370/331 |
| 2015/0365963 A1* | 12/2015 | Won | H04W 36/02 370/329 |
| 2018/0220327 A1* | 8/2018 | Karampatsis | H04L 47/32 |
| 2019/0350047 A1* | 11/2019 | Shan | H04W 8/24 |
| 2020/0053525 A1* | 2/2020 | Byun | H04W 76/14 |

OTHER PUBLICATIONS

S1-172103: SA WG2 Meeting #120, Mar. 27-31, 2017, Busan S. Korea, Nokia, "e-Remote-UE's EPs Bearer handling with eRelay-UE scenerio," pp. 1-5.

* cited by examiner

[Figure 1]
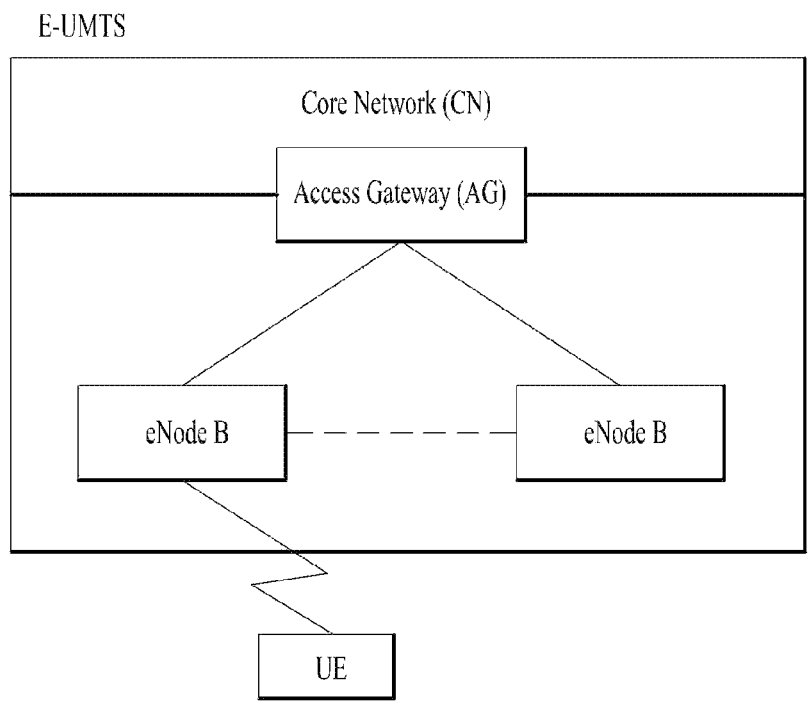

[Figure 2A]
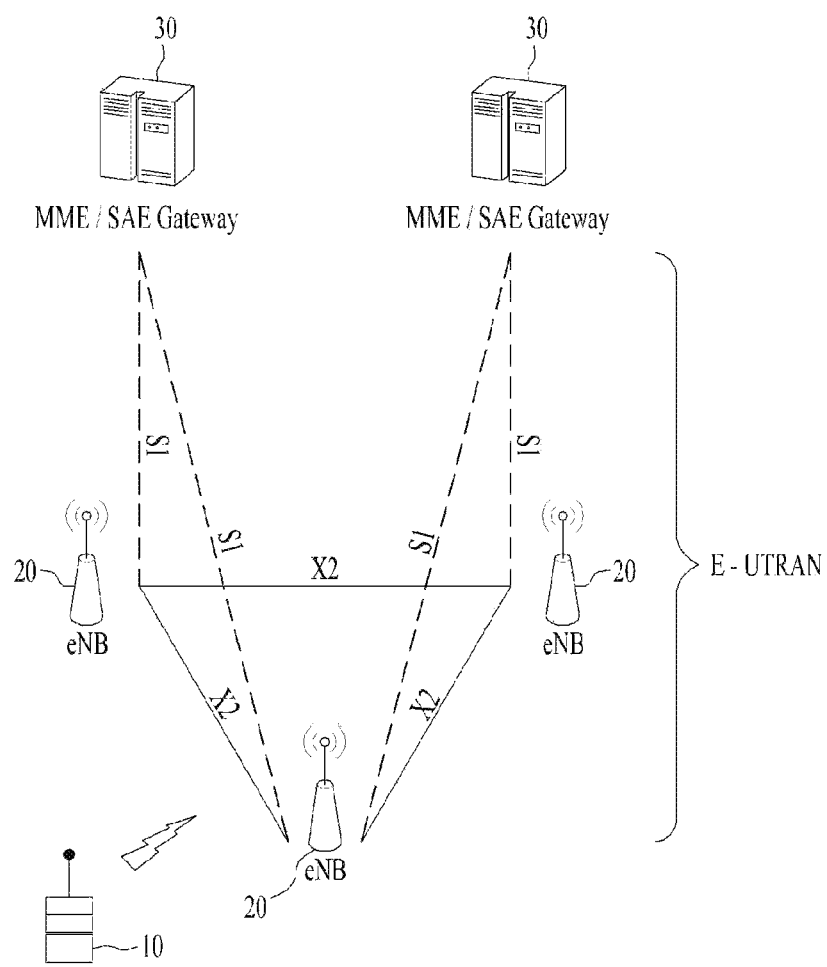

[Figure 2B]
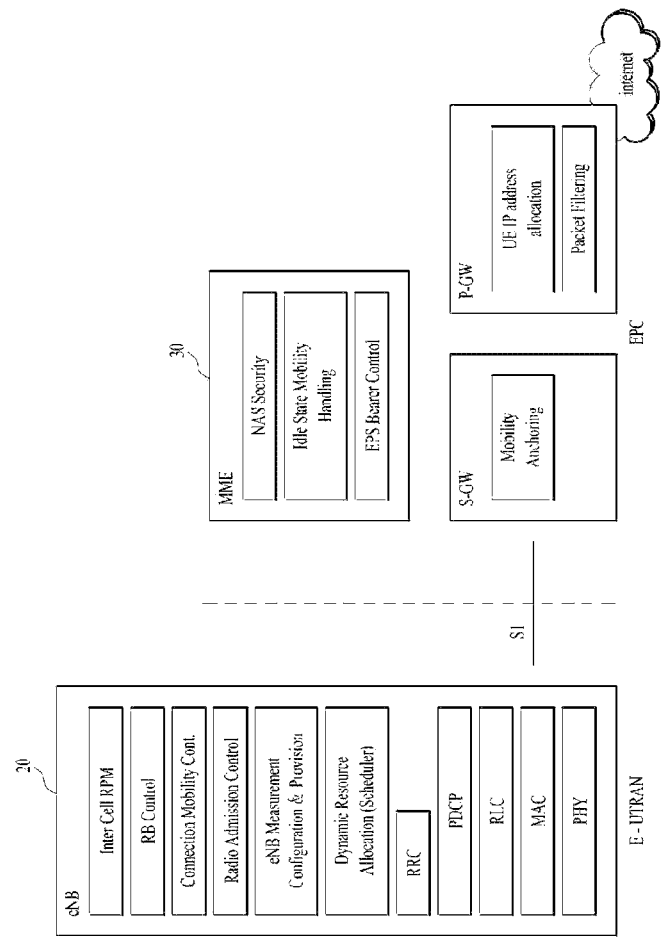

[Figure 3]
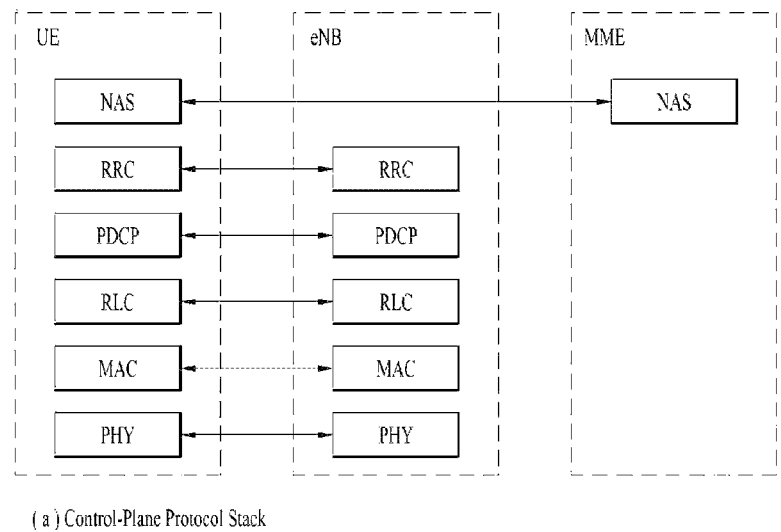
( a ) Control-Plane Protocol Stack
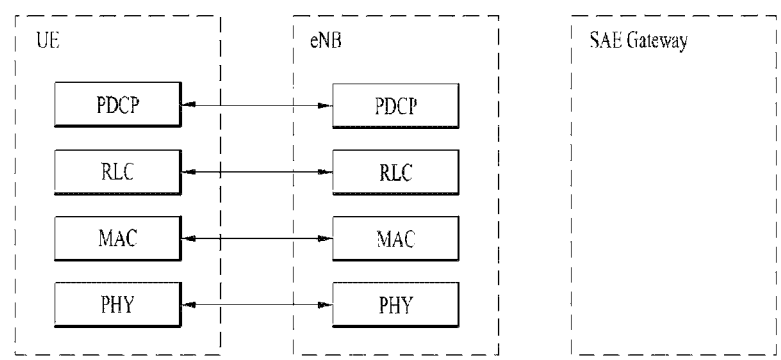
( b ) User-Plane Protocol Stack

[Figure 4]
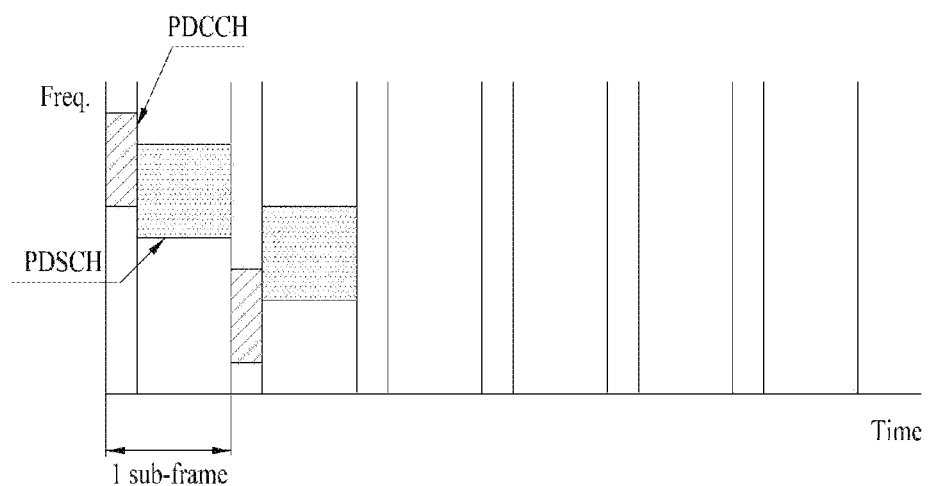

[Fig. 5]
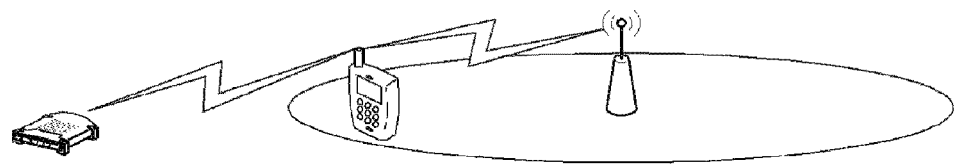
Scenario 1 : OCC and connected to relay
Scenario 2 : OCC and no connection to relay
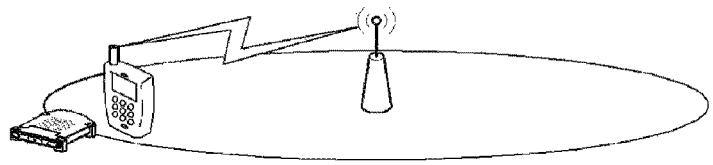
Scenario 3 : In coverage and no connection to relay
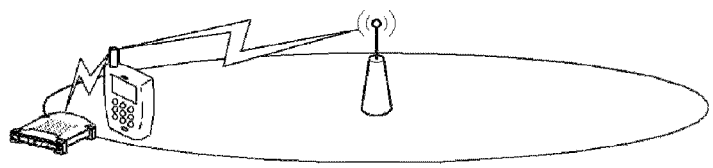
Scenario 4 : In coverage and connection to relay

[Figure 6]
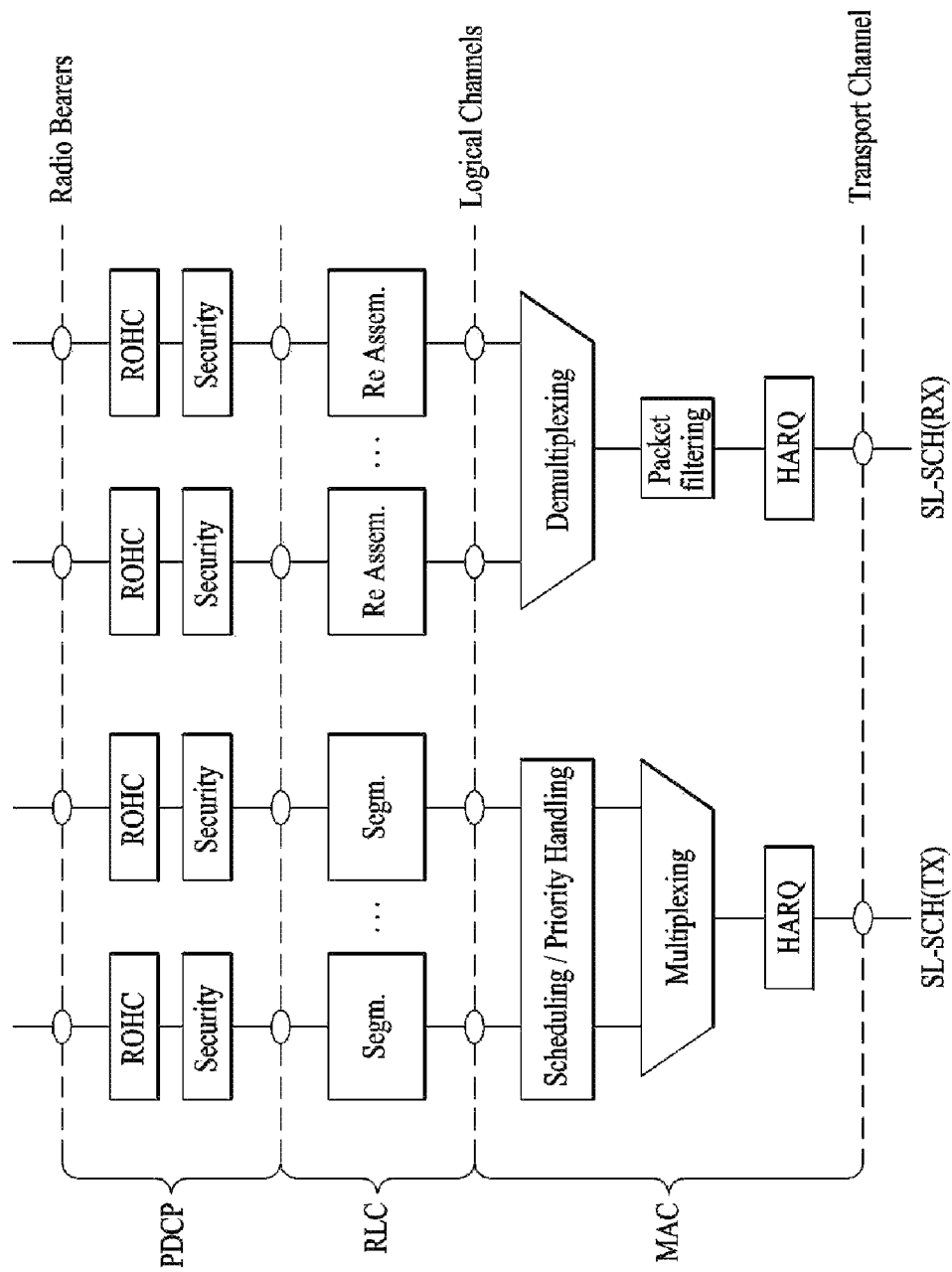

[Figure 7]
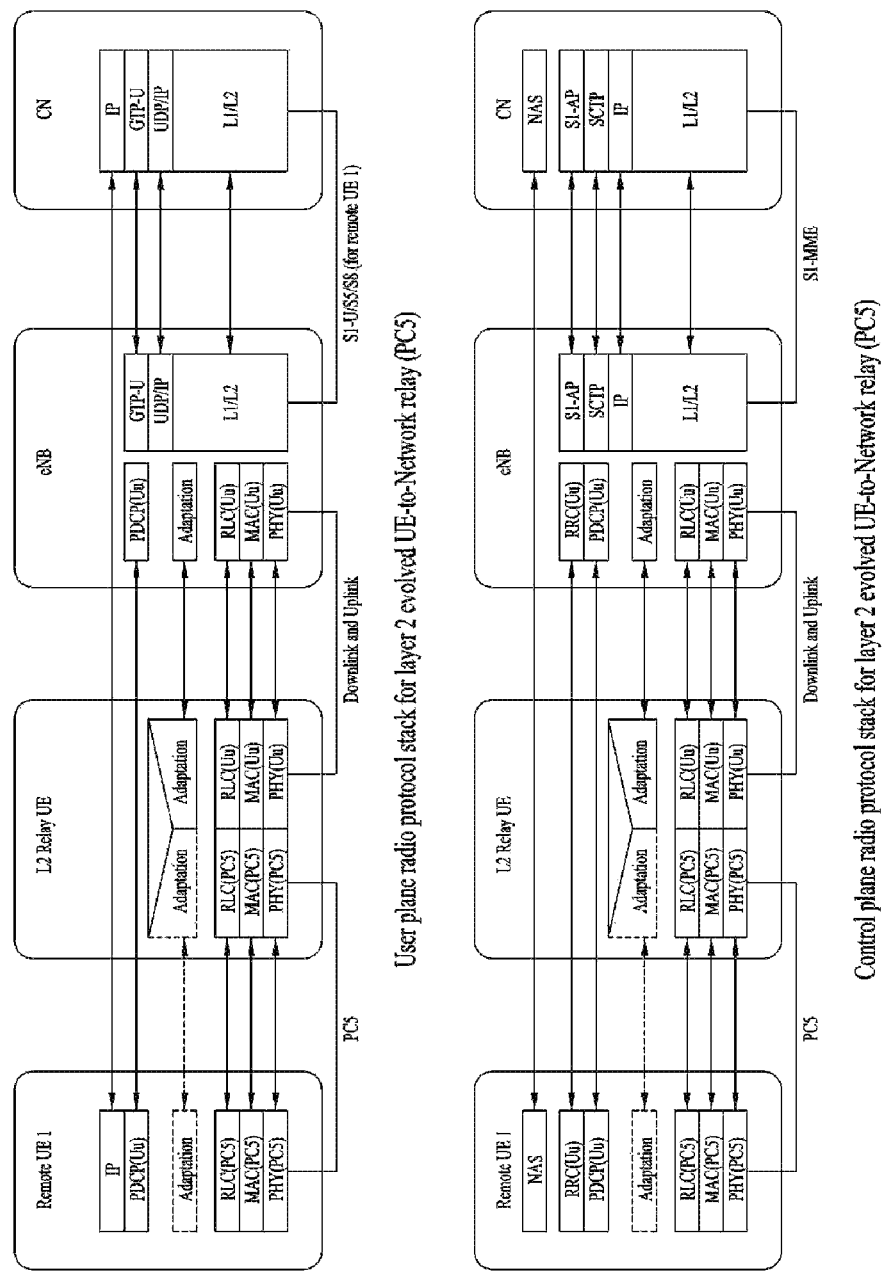

[Figure 8]
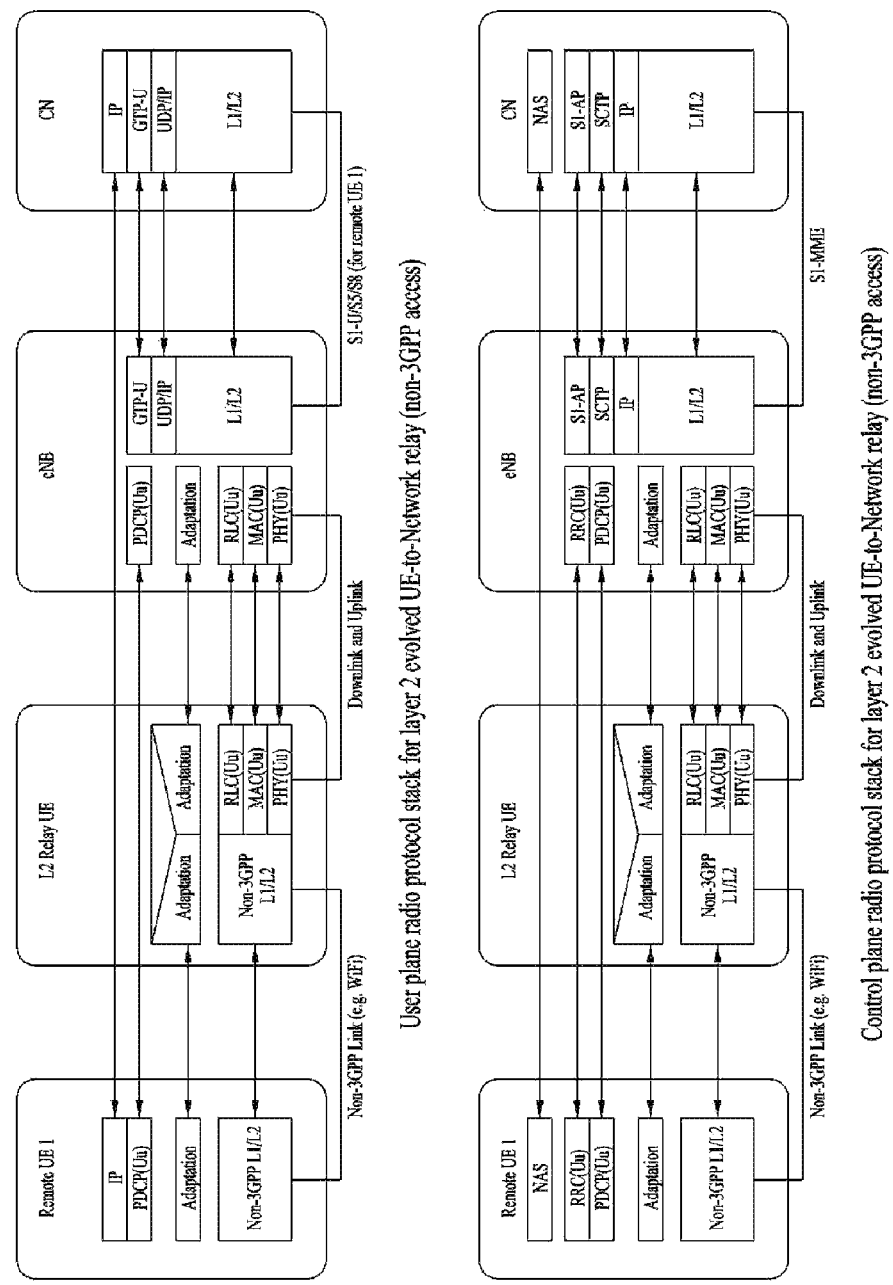

[Figure 9]
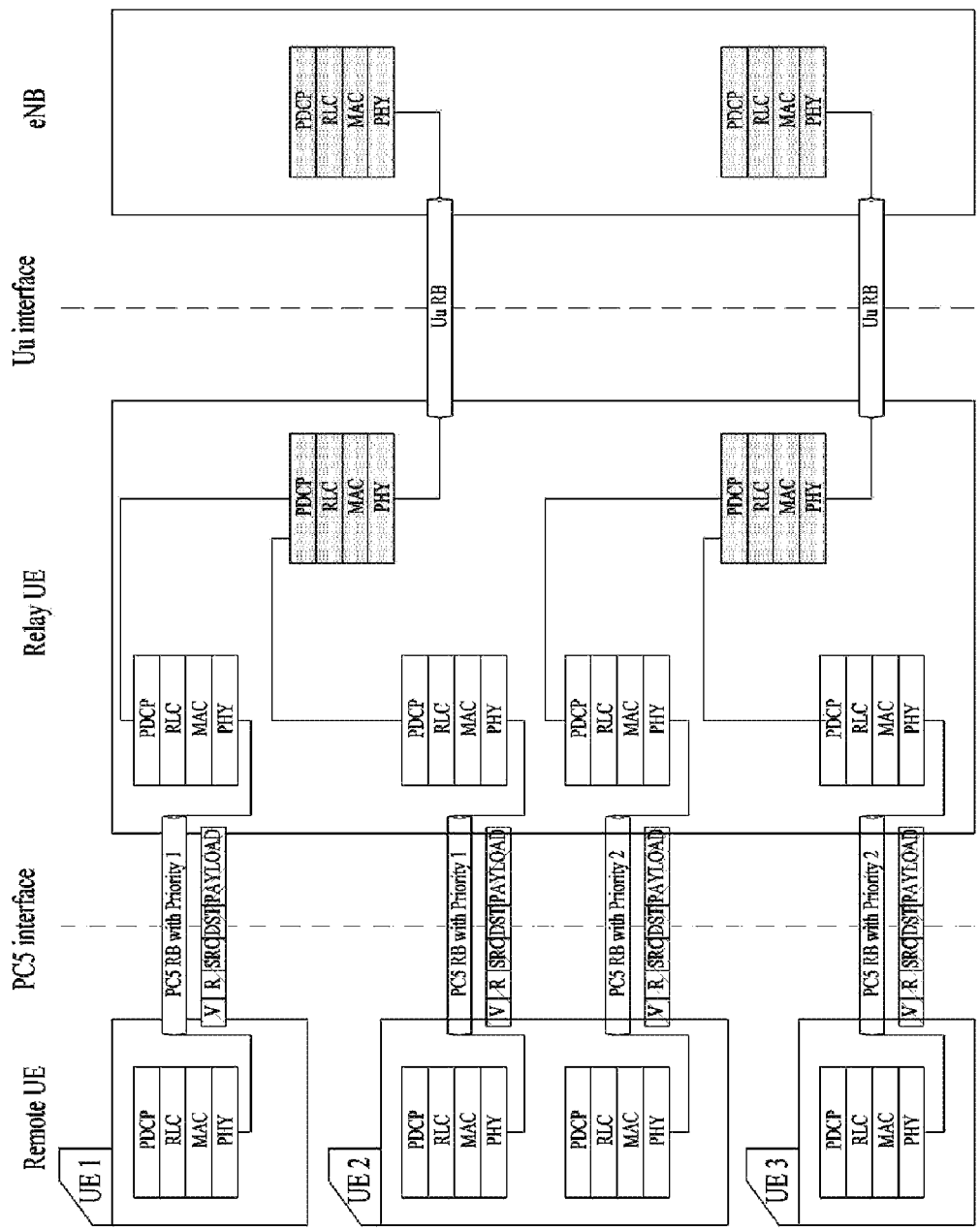

[Figure 10]
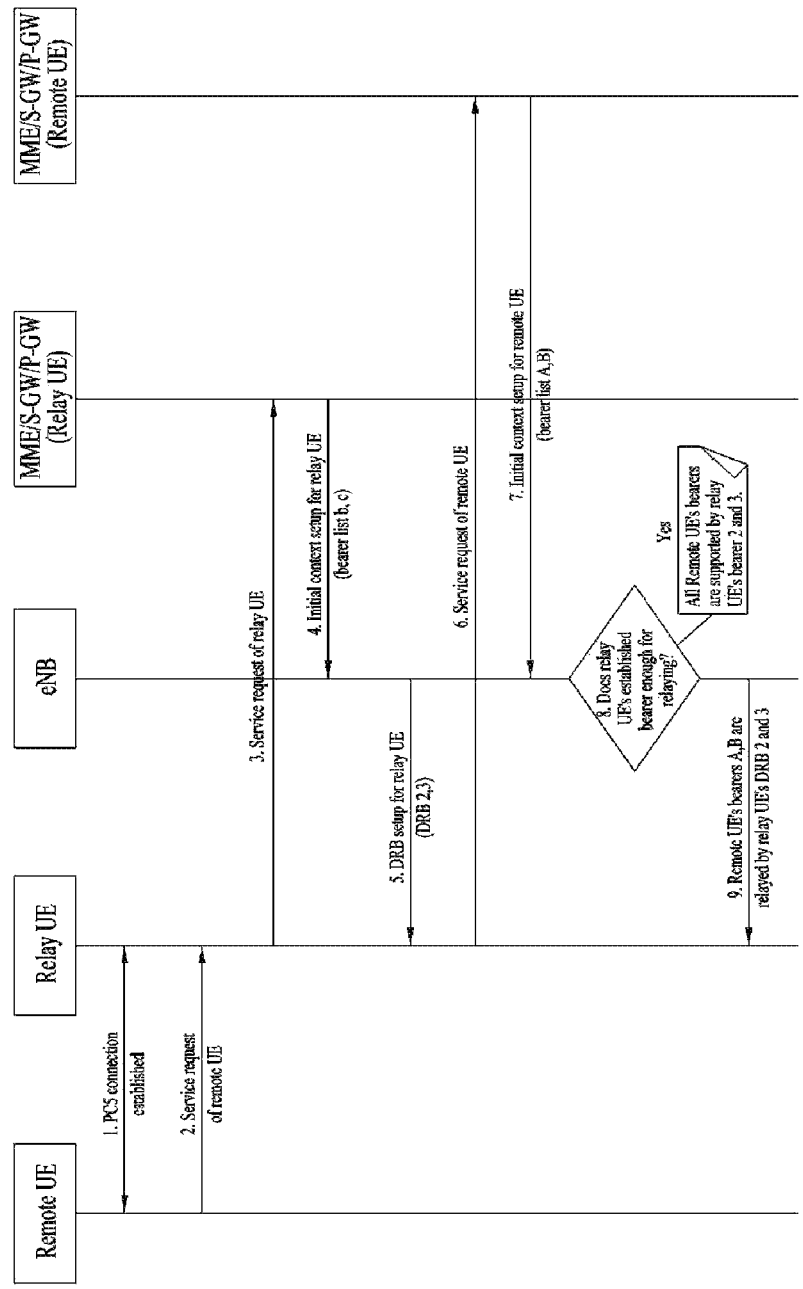

[Figure 11]
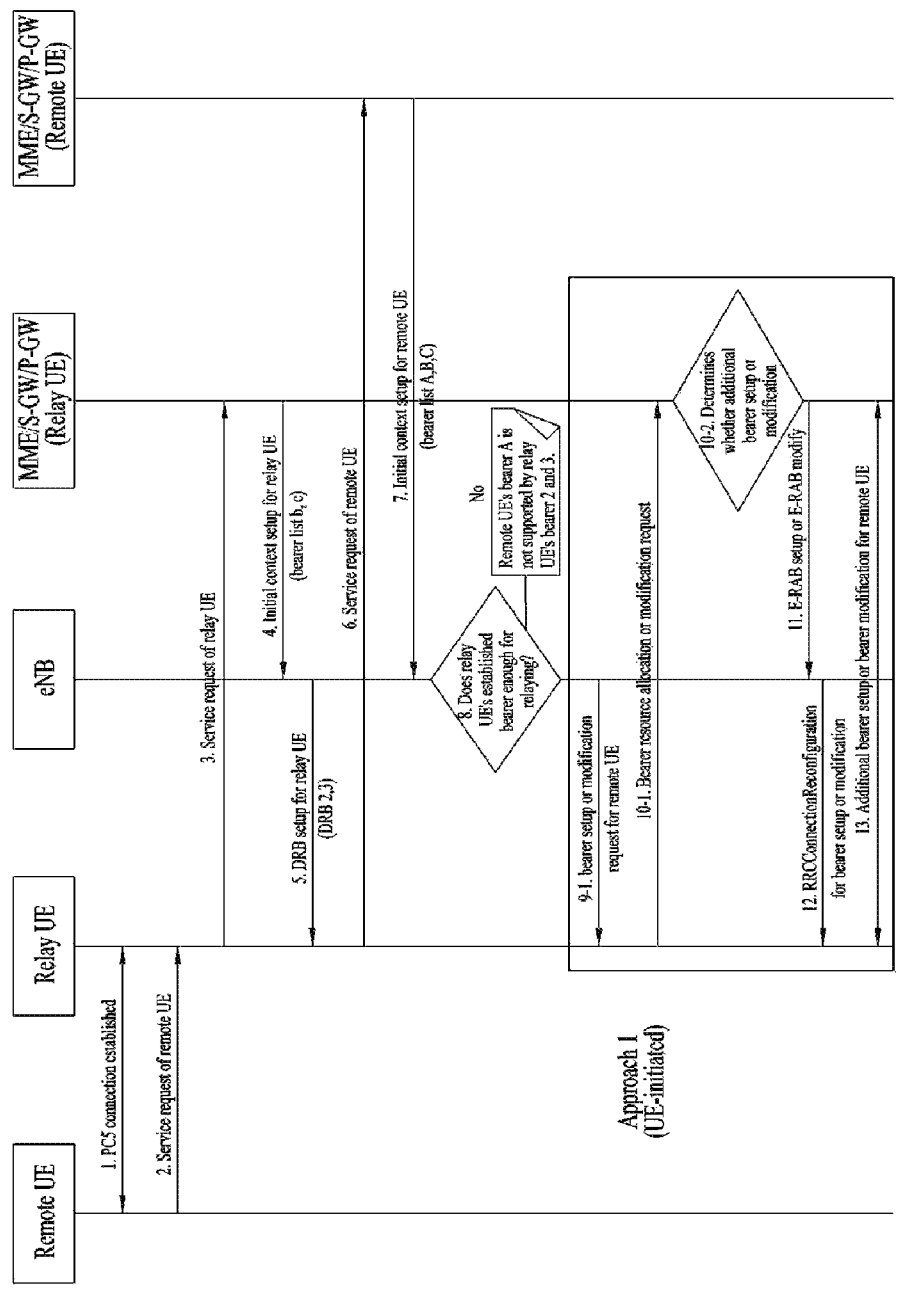

[Figure 12]
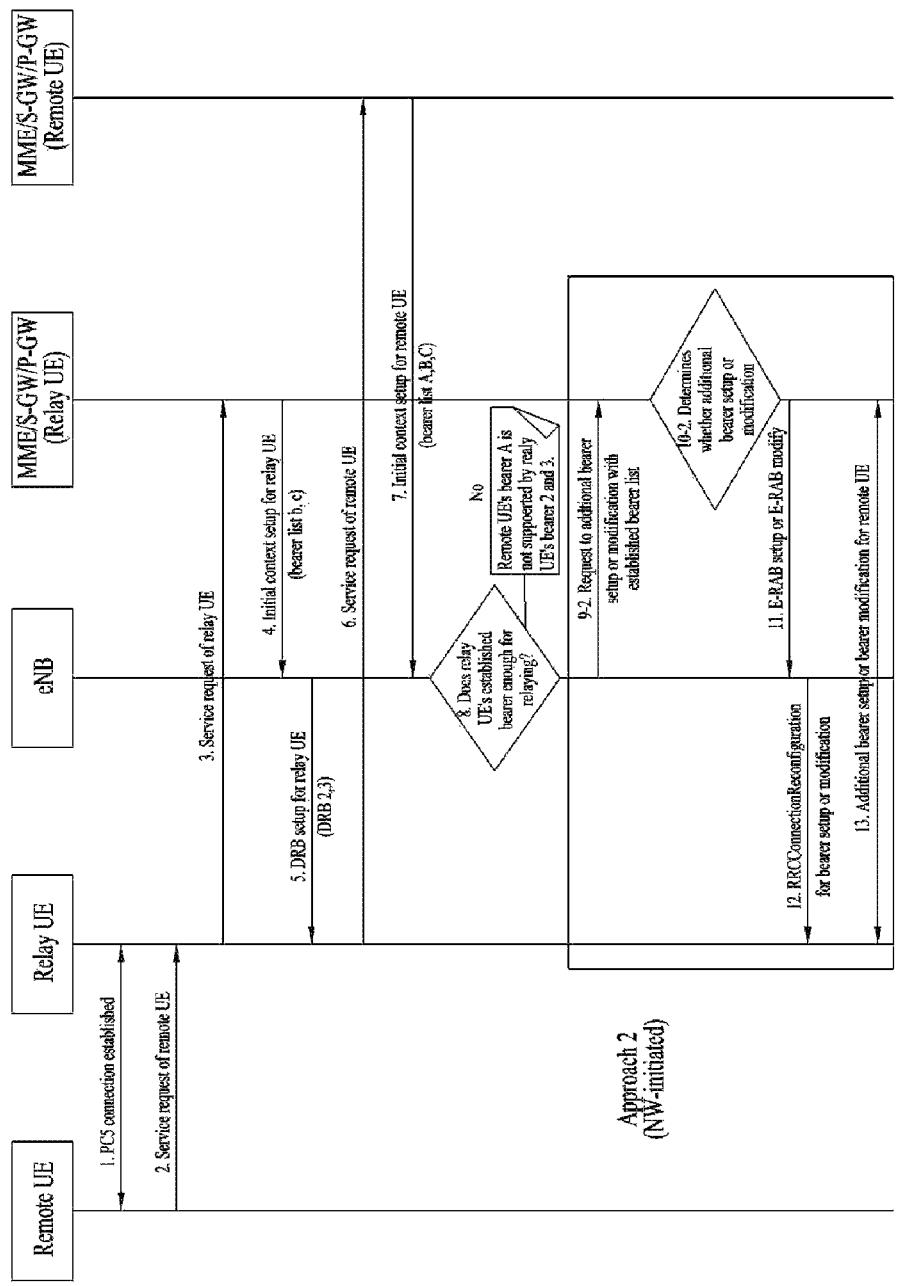

[Figure 13]
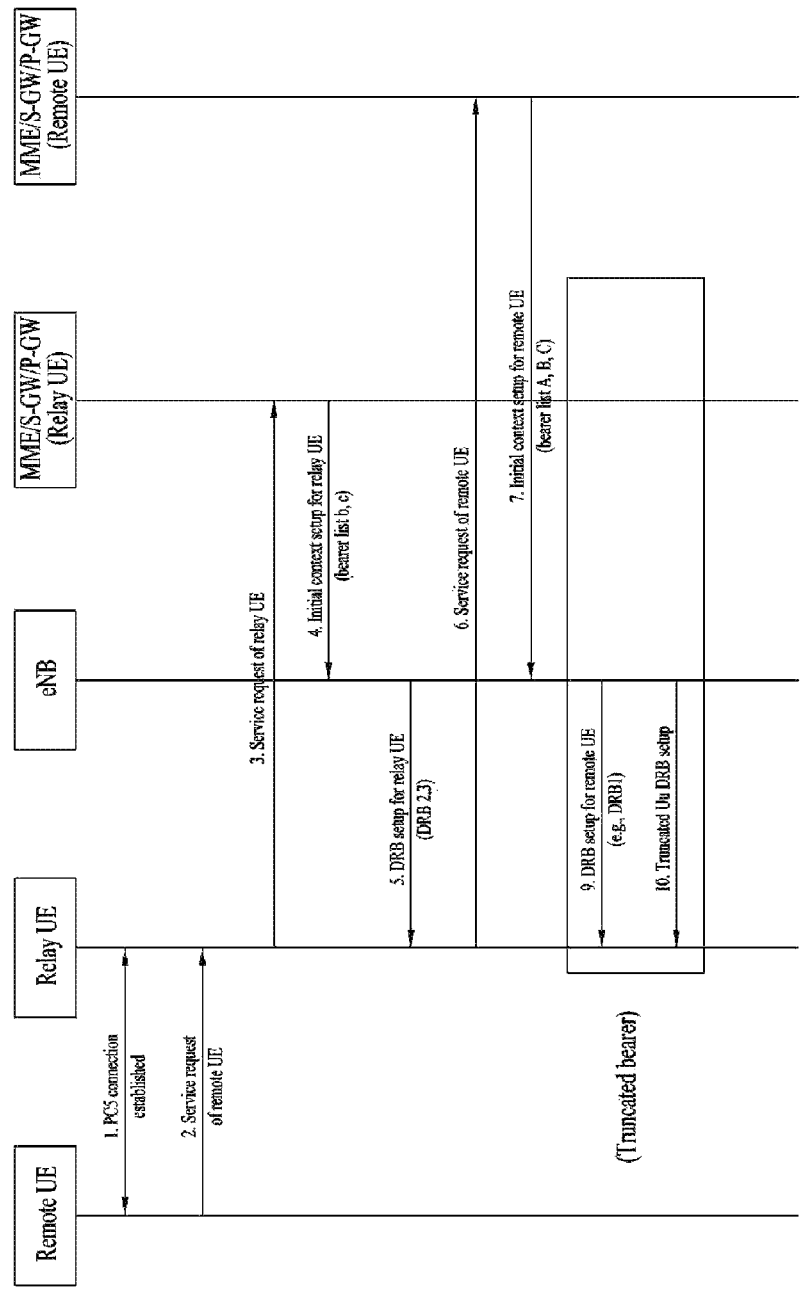

[Figure 14]
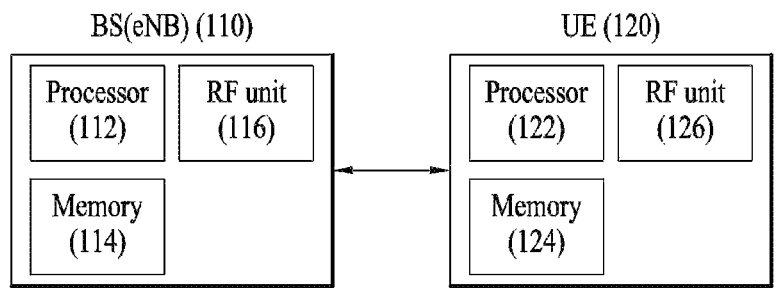

METHOD AND APPARATUS FOR MANAGING A BEARER CONFIGURATION OF A RELAY USER EQUIPMENT

This application is a National Stage Entry of International Application No. PCT/KR2018/005216 filed May 4, 2018, which claims the benefit of U.S. Provisional Application No. 62/502,588 filed May 5, 2017, all of which are hereby incorporated by reference in their entirety for all purposes as if fully set forth herein.

TECHNICAL FIELD

The present invention is directed to a method and an apparatus for use in a wireless communication system. Specifically, the present invention is directed to a method and an apparatus of managing a bearer configuration of a relay User Equipment (UE).

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) and the like.

DISCLOSURE

Technical Problem

An object of the present invention is to provide a method and an apparatus of manage a bearer configuration for a relay UE.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method for a Base Station (BS) to manage bearers in a cellular communication system is provided, the method comprising: receiving a bearer list of a relay User Equipment (UE) from a mobility management entity (MME) of the relay UE; receiving a bearer list of a remote UE from a MME of the remote UE; and if the bearer list of the relay UE has no bearer that matches to the bearer list of the remote UE in terms of delay budget of a specific service, transmitting a request for additional bearer setup including a cause value associated with the delay budget to the MME of the relay UE.

As another aspect of the invention, a Base Station (BS) configured to manage bearers in a wireless communication system is provided. The BS comprises: a radio frequency (RF) unit; and a processor, wherein the processor is configured to: receive a bearer list of a relay User Equipment (UE) from a mobility management entity (MME) of the relay UE, receive a bearer list of a remote UE from a MME of the remote UE, and if the bearer list of the relay UE has no bearer that matches to the bearer list of the remote UE in terms of delay budget of a specific service, transmit a request for additional bearer setup including a cause value associated with the delay budget to the MME of the relay UE.

Preferably, the cause value may be associated with indicating that the relay UE has no enough bearer(s) for relaying the relay UE due to no matching delay budget.

Preferably, the specific service may be an emergency call or a public safety alarm.

Preferably, a radio bearer setup message for a remote UE may be further received from the MME of the relay UE, and a radio resource control connection reconfiguration message for indicating a radio bearer setup for the remote UE is further transmitted to the relay UE.

Preferably, each bearer list may indicate Data Radio Bearer(s) (DRB(s)) established for a respective UE.

Preferably, the wireless communication system may include a 3rd Generation Partnership Project (3GPP)-based wireless communication system.

Advantageous Effects

Exemplary embodiments of the present invention have the following effects. In accordance with the embodiments of the present invention, a bearer configuration for a relay UE can be efficiently managed.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a diagram of an example physical channel structure used in an E-UMTS system;

FIG. 5 is a conceptual diagram illustrating relay scenarios;

FIG. 6 is a conceptual diagram illustrating for a Layer 2 Structure for Sidelink;

FIGS. 7~8 illustrate radio protocol stacks for layer 2 relay;

FIG. 9 is an example for PC5 interface between remote UEs and a relay UE;

FIG. 10 illustrates operations for relaying Uu DRB without additional bearer setup according to the present invention;

FIGS. 11~13 illustrate operations for relaying Uu DRB with additional bearer setup or modification according to the present invention; and FIG. 14 illustrates a block diagram of a User Equipment (UE) and a Base Station (BS).

MODE FOR INVENTION

Reference will now be made in detail to the preferred embodiments of the present invention with reference to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an Si interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of a network (e.g., EUTRAN, NG-RNA) coverage (subject to regional regulation and operator policy, and limited to specific public-safety designated frequency bands and terminals).

There is a lot of interest to connect and manage low cost devices. One example of such low cost devices are wearables, which also have the benefit of almost always being in close proximity to a smartphone that can serve as a relay. Another example of such low cost devices are Machine Type Communication (MTC) devices and Internet of Things (IoT) devices.

There are two network connection modes. The first mode is a direct network connection mode, where there is no relay UE between a UE and a network (e.g., 5G network). In the direct network connection mode, connection between the UE and the network is made using Uu-interface. The second mode is an indirect network connection mode, where there is a relay UE between a UE and a network (e.g., 5G network). In the indirect network connection mode, a connection is made using an intermediate UE relay, which uses PC5 interface between a relay UE and a remote UE, and Uu interface between the relay UE and eNB (or gNB). Relaying using D2D can also be based on non-3GPP technologies such as Bluetooth and Wi-Fi. In this case, non-3GPP link is used between a relay UE and a remote UE, and Uu interface is used between the relay UE and eNB (or gNB).

FIG. 5 is a conceptual diagram illustrating relay scenarios. Referring to the FIG. 5, four scenarios can be considered according to coverages.

Scenario 1: A relay UE is in a network coverage and a remote UE is out of the network coverage, and the remote UE and the relay UE are paired or connected. The remote UE is able to transmit/receive signals to/from a BS via the relay UE.

Scenario 2: A relay UE is in a network coverage and a remote UE is out of the network coverage, and the remote UE and the relay UE are not paired or connected. The remote UE can initiate establishing a connection to the relay UE. Also, the network can initiate establishing a connection between the remote UE and the relay UE.

Scenario 3: A relay UE is in a network coverage and a remote UE is in the network coverage, and the remote UE and the relay UE are not paired or connected. Here, "in coverage" may means that an UE in an enhanced coverage. The enhanced coverage implies that the UE is connecting to the network via Rel-13 Machine Type Communication (MTC) in Coverage Enhancement (CE) mode. In this case, either the remote UE or the network can initiate establishing a connection between the remote UE and the relay UE.

Scenario 4: A relay UE is in a network coverage and a remote UE is in the network coverage, and the remote UE and the relay UE are paired or connected. The remote UE is able to transmit/receive signals to/from a BS via the relay UE.

In the scenarios, a remote UE is not required to be in RRC_CONNECTED while paired or connected with a relay UE. Also, the relay UE may be in RRC_IDLE while paired with a remote UE, and in this case the remote UE is not in RRC_CONNECTED. When used to describe a UE, RRC_CONNECTED means that the UE has a context in the eNB.

FIG. 6 is a conceptual diagram illustrating for a Layer 2 structure for Sidelink.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signalled by the eNB. When the UE is out of coverage, if the UE selects another UE as a synchronization reference, then the content of SBCCH is derived from the received SBCCH; otherwise UE uses pre-configured parameters. SIB provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The sidelink Control period is the period over which resources allocated in a cell for sidelink control information and sidelink data transmissions occur. Within the sidelink Control period the UE sends sidelink control information followed by sidelink data. sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order:
i. Uu transmission/reception (highest priority);
ii. PC5 sidelink communication transmission/reception;
iii. PC5 sidelink discovery announcement/monitoring (lowest priority).

FIG. 7 shows user plane protocol stack and the control plane protocol stack for supporting layer 2 relay when PC5 is used between the remote UE and the relay UE. FIG. 8 shows user plane protocol stack and the control plane protocol stack for supporting layer 2 relay when non-3GPP access is used between the remote UE and the relay UE. In the protocol architecture, relaying is performed above RLC sublayer. Remote UE's user plane and control plane data are relayed above RLC via a relay UE from the remote UE to a network and vice versa. Uu PDCP and Uu RRC are terminated between the remote UE and the eNB while RLC, MAC and PHY and the non-3GPP transport layers are terminated in each link (i.e. the link between the remote UE and the relay UE, and the link between the relay UE and the eNB).

Traffic of one or multiple remote UEs may be mapped to a single Data Radio Bearer (DRB) of Uu interface of the relay UE. Multiple Uu DRBs may be used to carry traffics of different Quality of Service (QoS) classes, for one or multiple remote UEs. It is also possible to multiplex traffic of relay UE itself onto the Uu DRB, which is used to relay traffic to/from remote UEs. How the mapping of the traffic between sidelink bearers and Uu bearers is done is up to eNB implementation and the mapping is configured in relay UE by the eNB. An adaptation layer over Uu is supported to identify the remote UE/relay UE. Specifically, within a Uu DRB, different remote UEs and different bearers of the remote UE are indicated by information in adaptation layer header which is added to PDCP PDU. The adaptation layer is also supported over non-3GPP access for the short range link between the remote UE and the relay UE.

FIG. 9 is an example for PC5 interface between remote UEs and a relay UE.

In ProSe, a UE communicates with other UEs directly over PC5 interface.

By introducing a Relay UE for UE-to-NW relay, a remote UE transmits data to an eNB via the Relay UE, and the eNB transmits data to the remote UE via the Relay UE. That is, the Relay UE relays data to/from eNB.

As data transfer between the remote UE and the Relay UE is ProSe communication, the Relay UE is communicating with the remote UE over PC5 interface. In the meantime, as data transfer between the Relay UE and the eNB is a normal uplink/downlink (Uu) communication, the Relay UE is communicating with the eNB over Uu interface. This implies that if data has higher priority in PC5 communication, it should also be higher prioritized in Uu communication.

Over PC5 interface, Per-Packet Priority (PPP), is used to prioritize a certain packet, where the priority is independent with ProSe destination or ProSe UE. In order to prioritize the packet with higher priority over Uu interface as well, the Relay UE needs to know the priority of the packet so that the Relay UE provides more opportunities of transmission to the packet with higher priority.

In order to transmit on the SL-SCH, the MAC entity must have a sidelink grant. The sidelink grant is selected as follows: if the MAC entity is configured to receive a sidelink grant dynamically on the PDCCH and more data is available in STCH than can be transmitted in the current SC period, the MAC entity shall determine a set of subframes in which transmission of SCI and transmission of first transport block occur using the received sidelink grant, consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available, and clear the configured sidelink grant at the end of the corresponding SC Period.

If the MAC entity has a configured sidelink grant occurring in this subframe, and if the configured sidelink grant corresponds to transmission of SCI, the MAC entity shall, for each subframe, instruct the physical layer to transmit SCI corresponding to the configured sidelink grant.

If the MAC entity has a configured sidelink grant occurring in this subframe, and if the configured sidelink grant corresponds to transmission of first transport block, the MAC entity shall deliver the configured sidelink grant and the associated HARQ information to the Sidelink HARQ Entity for this subframe.

For PDU(s) associated with one SCI, MAC shall consider only logical channels with same Source Layer-2 ID-Destination Layer-2 ID pairs.

EXAMPLE

Bearer Configuration for a Relay UE

FIG. 9 illustrates a procedure of relaying Uu DRB without additional bearer setup.

Step 1. Initially, a remote UE needs to discover relay UE, and then PC5 connection is established between a remote UE and a relay UE.

Step 2. If a remote UE needs to send data packet from the remote UE's DRB to an eNB via a relay UE, the remote UE could initiate a service request procedure by sending a service request of the remote UE to a relay UE.

Step 3. After receiving the service request from the remote UE, the relay UE may send a service request of the relay UE to a MME of the relay UE so as to make a DRB setup.

Step 4. As a response to the service request of remote UE, the MME of the relay UE may send an initial context setup request for the relay UE to the eNB. The Initial context setup request contains information required by the eNB to build E-UTRAN Radio Access Bearer (E-RAB) configuration consisting of at least one additional E-RAB. Here, the initial context setup request for the relay UE includes a bearer list for the relay UE. The bearer list may indicate successfully established DRBs (e.g., bearer list b, c) for the relay UE.

Step 5. After receiving the initial context setup request for the relay UE, the eNB may send a DRB setup for relay UE to the relay UE. Specifically, the eNB may establish DRB(s) by using RRC connection reconfiguration procedure. An EPS bearer has cross multiple interfaces: S5/S8 interface from the P-GW to the S-GW, S1 interface from the S-GW to the eNB, and radio interface (i.e., Uu interface) from the eNB to the UE. Across each interface, the EPS bearer is mapped onto a lower layer bearer, each with its own bearer identity. Each node must keep track of the binding between the bearer IDs across its different interfaces. Specifically, an S5/S8 bearer transports packets of an EPS bearer between a P-GW and a S-GW. The S-GW stores a one-to-one mapping between an S1 bearer and an S5/S8 bearer. An S1 bearer transports packets of an EPS bearer between a S-GW and an eNB. A radio bearer transports the packets of an EPS bearer between a UE and an eNB. The radio bearer includes a Data Radio Bearer (DRB). In this example, the eNB may establish DRBs 2~3, which have corresponding EPS bearers.

Step 6. After receiving the service request from the remote UE, the relay UE may send a service request of the remote UE to a MME of the remote UE.

Step 7. As a response to the service request of remote UE, the MME of the remote UE may send an initial context setup request for the remote UE to the eNB. Here, the initial context setup request for the relay UE may include a bearer list for the relay UE (e.g., bearers A, B).

Step 8. The eNB may check whether relay UE's established bearers (e.g., bearer 2, 3) are enough for relaying (i.e., relaying the remote UE's bearer(s)), based on the bearer lists of Step 4 and the bearer lists of Step 7.

Step 9. If the current established relay UE's DRBs (e.g., bearers 2 and 3) are enough for relaying the remote UE's bearers (e.g., bearer A, B), the eNB may send a message indicating that the remote UE's bearers can be relayed by the relay UE's DRBs, without additional bearer setup.

FIGS. 10~13 illustrate a procedure of relaying Uu DRB with bearer setup or modification. After the bearer of the relay UE is established as in step 5 in FIG. 9, the eNB may receive the initial context setup request for remote UE which includes a bearer list (e.g. bearers A, B and C) of the remote UE. It is possible that the bearer C of the remote UE is not supported by the established relay UE's bearer (e.g. DRBs 2 and 3) while the other bearers (i.e. bearers A and B) is supported by the established relay UE's bearer. In this situation, in order to relay remote UE's bearer (i.e., bearer C), additional bearer of relay UE (e.g., DRB 1) may be required to be setup. In addition to the above case, if the new bearer is required for the remote UE, it is also possible that the new bearer is not supported by the current established radio bearer of the relay UE. In order to resolve the above situation, following approaches can be considered.

Basically, Steps 1 to 8 are substantially same as Steps 1 to 8 of FIG. 9, except that the initial context setup request of step 7 includes information about a bearer of the remote UE (e.g., bearer C) that is not supported by the relay UE. First, Step 8 is explained in more detail.

Step 8. The eNB considers whether the relay UE's established bearers (e.g., DRBs 2 and 3) are enough for relaying or not according to the initial context setup requests of Steps 4 and 7. If the established bearers are not enough for relaying, the eNB can determine that additional bearer setup or bearer modification is required for remote UE's DRB relaying. Indication of additional bearer setup can be categorized with multiple cause values as follows:

Case 1: Additional Bearer setup for relay UE.
  Cause value 1-1: No matching bearer regarding QoS parameters. In order to determine whether there is no matching bearer regarding QoS parameters, one or multiple QoS parameter(s) can be considered for a transmitting traffic pattern (e.g., one shot transmission, multiple transmission, periodic transmission) and/or a specific service (e.g., delay tolerant or delay sensitive or high reliability transmission). Also, one or multiple QoS parameter(s) can be considered based on status of a relay UE or a remote UE (e.g., congestion level, configured resource). Thus, whether there is no matching bearer regarding QoS parameters can be determined (for a specific service (e.g., delay tolerant or delay sensitive or high reliability transmission)) based on a combination QoS parameter(s) and a transmitting traffic pattern, or a combination QoS parameter(s) and a status of a relay UE or a remote UE (e.g., congestion level, configured resource).

For example, QoS parameters may include at least one of:
    QoS Class Identifier (QCI): An integer from 1 to 9, which indicates nine different QoS performance characteristics of each IP packet. QCI values are standardized to reference specific QoS characteristics, and each QCI contains standardized performance characteristics (values). QoS to be guaranteed for an EPS bearer varies depending on the QCI values specified such as resource type (GBR or non-GBR), priority (1-9), (Packet) Delay Budget (allowed packet delay shown in values ranging from 50 ms to 300 ms), Packet Error Loss Rate (allowed packet loss shown in values from $10^{-2}$ to $10^{-6}$).
    Guaranteed Bit Rate (GBR): For an EPS bearer, having a GBR resource type means the bandwidth of the bearer is guaranteed.
    Maximum Bit Rate (MBR): MBR is used for a GBR type bearer, and indicates the maximum bit rate allowed in the LTE network. Any packets arriving at the bearer after the specified MBR is exceeded will be discarded.
    Allocation and Retention Priority (ARP): When a new EPS bearer is needed in an LTE network with insufficient resources, an LTE entity (e.g. P-GW, S-GW or eNB) decides, based on ARP (an integer ranging from 1 to 15, with 1 being the highest level of priority), whether to: remove the existing EPS bearer and create a new one (e.g. removing an EPS bearer with low priority ARP to create one with high priority ARP); or refuse to create a new one.
  Cause value 1-2: No matching bearer due to (packet) delay budget for a specific service (e.g., emergency call, public safety alarm). Packet delay budget shows how much delay can be tolerated for the packets passing through a particular EPS bearer.
  Cause value 1-3: No matching bearer type (e.g., Signaling RB (SRB), DRB).
Case 2: Established bearer modification for relay UE.
  Cause value 2-1: No matching bearer regarding QoS parameters. In order to determine whether there is no matching bearer regarding QoS parameters, one or multiple QoS parameter(s) can be considered for a transmitting traffic pattern (e.g., one shot transmission, multiple transmission, periodic transmission) and/or a specific service (e.g., delay tolerant or delay sensitive or high reliability transmission). Also, one or multiple QoS parameter(s) can be considered based on status of a relay UE or a remote UE (e.g., congestion level, configured resource). Thus, whether there is no matching bearer regarding QoS parameters can be determined (for a specific service (e.g., delay tolerant or delay sensitive or high reliability transmission)) based on a combination QoS parameter(s) and a transmitting traffic pattern, or a combination QoS parameter(s) and a status of a relay UE or a remote UE (e.g., congestion level, configured resource). For example, QoS parameters may include at least one of: QCI, GBR, MBR, ARP.
  Cause value 2-2: No matching bearer due to (packet) delay budget for a specific service (e.g., emergency call, public safety alarm).
  Cause value 1-3: No matching bearer type (e.g., SRB, DRB).

[Approach 1: UE-initiated] (FIG. 11)

Step 9-1. The eNB may request an EPS bearer setup or modification request (e.g., E-RAB setup or modify request) to the relay UE.

Step 10-1. The relay UE may receive Indication of E-RAB via RRC layer message. Then, in order to trigger bearer setup or modification, such indication needs to be moved to NAS layer. Then, the relay UE in NAS determines to trigger bearer setup, then it requests bearer resource allocation or modification to a network (e.g., MME of the relay UE).

[Approach 2: NW-initiated] (FIG. 12)

Step 9-2. The eNB requests an EPS bearer setup or modification with established bearer lists to the MME of relay UE.

[Common operations in approaches 1 and 2] (FIGS. 11~12)

Step 10-2. The MME of the relay UE determines whether performing additional bearer setup or bearer modification 1) Upon receiving the request, the network may perform E-RAB setup or modification procedure with the relay UE.

Considering the cause value, the network can request appropriate bearer setup. For example, the network sends ACTIVATE DEDICATED EPS BEARER CONTEXT REQUEST message. Then UE responds ACTIVATE DEDICATED EPS BEARER CONTEXT REQUEST ACCEPT.

Considering the cause value, the network can request appropriate bearer modification. For example, the network sends MODIFY EPS BEARER CONTEXT REQUEST message. Then UE responds MODIFY EPS BEARER CONTEXT ACCEPT message.

Steps 11, 12. Then network performs E-RAB setup or E-RAB modify procedure with the relay UE. Specifically, the network transmits E-RAB setup or modification request to the eNB (Step 11), and the eNB may indicate bearer setup or modification using a RRC connection reconfiguration message (Step 12).

Step 13. Additional bearer setup or bearer modification with relay UE is completed between the network (e.g., MME of the relay UE) and relay UE.

According to the current 3GPP technical specification, while additional bearer is required as in Step 8, the eNB cannot trigger an EPS bearer setup procedure. But, according to the present invention, the eNB is able to trigger either the relay UE or MME of relay UE to establish additional new EPS bearer or bearer modification. Upon the request from the relay UE, the network is able to setup an additional EPS bearer or modify bearer for relay UE.

[Approach 3: Truncated bearer] (FIG. 13)

Step 9. If additional bearer is required as in Step 8, the eNB may request a relay UE to perform a DRB setup for the remote UE.

Step 10. In response to the DRB setup request, the relay UE may establish a truncated Uu DRB between the eNB and the relay UE. The truncated Uu DRB has no corresponding EPS bearer (e.g., S1& S5 bearer). The truncated Uu DRB ends at the eNB the relay UE and is managed by the eNB. The truncated DRB is used to carry the remote UE's Uu DRB between the relay UE and the eNB.

FIG. 14 illustrates a BS and a UE to which the present invention is applicable. When a wireless communication system includes a relay, the BS or UE can be replaced by the relay.

Referring to FIG. 14, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a relay.

The invention claimed is:

1. A method for a Base Station (BS) to manage bearers in a cellular communication system, the method comprising:
   receiving a bearer list of a relay User Equipment (UE) from a mobility management entity (MME) of the relay UE;
   receiving a bearer list of a remote UE from a MME of the remote UE; and
   transmitting a request for additional bearer setup including a cause value associated with a delay budget of a specific service to the MME of the relay UE, based on the bearer list of the relay UE having no bearer that matches a bearer in the bearer list of the remote UE in terms of the delay budget of the specific service.

2. The method of claim 1, wherein the cause value is associated with an indication that the relay UE does not have enough bearer(s) for relaying between the remote UE and the base station due to no matching delay budget.

3. The method of claim 2, wherein the specific service is an emergency call or a public safety alarm.

4. The method of claim 1, further comprising:
   receiving a radio bearer setup message for the remote UE from the MME of the relay UE; and
   transmitting, to the relay UE, a radio resource control connection reconfiguration message indicating a radio bearer setup for the remote UE.

5. The method of claim 1, wherein each bearer list indicates Data Radio Bearer(s) (DRB(s)) established for a respective UE.

6. The method of claim 1, wherein the cellular communication system includes a 3rd Generation Partnership Project (3GPP)-based wireless communication system.

7. A Base Station (BS) configured to manage bearers in a cellular communication system, the BS comprising:
   a transmitter and a receiver; and
   a processor configured to:
   receive a bearer list of a relay User Equipment (UE) from a mobility management entity (MME) of the relay UE,
   receive a bearer list of a remote UE from a MME of the remote UE, and
   transmit a request for additional bearer setup including a cause value associated with a delay budget of a specific service to the MME of the relay UE, based on the bearer list of the relay UE having no bearer that matches a bearer in the bearer list of the remote UE in terms of the delay budget of the specific service.

8. The BS of claim 7, wherein the cause value is associated with an indication that the relay UE does not have enough bearer(s) for relaying between the remote UE and the base station due to no matching delay budget.

9. The BS of claim 8, wherein the specific service is an emergency call or a public safety alarm.

10. The BS of claim 7, wherein the processor is further configured to:
    receive a radio bearer setup message for the remote UE from the MME of the relay UE, and
    transmit, to the relay UE, a radio resource control connection reconfiguration message indicating a radio bearer setup for the remote UE.

11. The BS of claim 7, wherein each bearer list indicates Data Radio Bearer(s) (DRB(s)) established for a respective UE.

12. The BS of claim 7, wherein the cellular communication system includes a 3rd Generation Partnership Project (3GPP)-based wireless communication system.

* * * * *